(12) United States Patent
Holmes et al.

(10) Patent No.: US 11,388,432 B2
(45) Date of Patent: Jul. 12, 2022

(54) MOTION ESTIMATION THROUGH INPUT PERTURBATION

(71) Applicant: QUALCOMM Incorporated, San Diego, CA (US)

(72) Inventors: Samuel Benjamin Holmes, Sterling, MA (US); Martin Renschler, San Diego, CA (US); Jonathan Wicks, Louisville, CO (US); Robert John Vanreenen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 16/215,547

(22) Filed: Dec. 10, 2018

(65) Prior Publication Data

US 2020/0186817 A1 Jun. 11, 2020

(51) Int. Cl.
*H04N 19/513* (2014.01)
*H04N 19/186* (2014.01)
*H04N 19/436* (2014.01)
*G06T 15/00* (2011.01)

(52) U.S. Cl.
CPC ......... *H04N 19/513* (2014.11); *G06T 15/005* (2013.01); *H04N 19/186* (2014.11); *H04N 19/436* (2014.11)

(58) Field of Classification Search
CPC .. H04N 19/513; H04N 19/436; H04N 19/186; G06T 15/005; G06T 2207/10024; G06T 7/20
USPC .................................................... 375/240.16
See application file for complete search history.

(56) References Cited

U.S. PATENT DOCUMENTS

| 6,535,632 B1 * | 3/2003 | Park ..................... G06K 9/32 358/515 |
| 10,055,852 B2 | 8/2018 | Shimada |
| 2007/0002058 A1 | 1/2007 | Wittebrood |

(Continued)

FOREIGN PATENT DOCUMENTS

| JP | 2006128920 | * | 5/2006 |
| WO | 9629679 A1 | | 9/1996 |

OTHER PUBLICATIONS

English Translation of JP 2006128920, Chin et al., Japan. (Year: 2006).*

(Continued)

*Primary Examiner* — Kathleen V Nguyen
(74) *Attorney, Agent, or Firm* — Campbell C. Chiang; Procopio, Cory, Hargreaves & Savitch LLP

(57) ABSTRACT

The present disclosure relates to methods and devices for motion estimation which may include a GPU. In one aspect, the GPU may generate at least one first motion vector in a first subset of a frame, the first motion vector providing a first motion estimation for image data in the first subset of the frame. The GPU may also perturb the image data. Also, the GPU may generate at least one second motion vector based on the perturbed image data, the second motion vector providing a second motion estimation for the image data. Moreover, the GPU may compare the first motion vector and the second motion vector. Further, the GPU may determine at least one third motion vector for the motion estimation of the image data based on the comparison between the first motion vector and the second motion vector.

22 Claims, 7 Drawing Sheets

(56) References Cited

U.S. PATENT DOCUMENTS

| | | | | |
|---|---|---|---|---|
| 2011/0221967 A1* | 9/2011 | Yonaha | ................... | G06T 7/238 |
| | | | | 348/699 |
| 2011/0317045 A1* | 12/2011 | Vakrat | .................... | H04N 5/217 |
| | | | | 348/242 |
| 2013/0089146 A1* | 4/2013 | Matsumoto | ............ | H04N 19/44 |
| | | | | 375/240.12 |
| 2014/0210973 A1* | 7/2014 | Takahashi | ............... | G06T 7/254 |
| | | | | 348/65 |
| 2014/0354886 A1* | 12/2014 | Michaeli | ................ | G06T 5/003 |
| | | | | 348/607 |
| 2015/0117539 A1* | 4/2015 | Kobayashi | ........... | H04N 19/176 |
| | | | | 375/240.16 |
| 2019/0132606 A1* | 5/2019 | Su | ........................ | H04N 19/176 |
| 2019/0138838 A1* | 5/2019 | Liu | ........................ | G06T 5/002 |

OTHER PUBLICATIONS

International Search Report and Written Opinion—PCT/US2019/065149—ISA/EPO—dated Apr. 2, 2020.

* cited by examiner

MOTION ESTIMATION THROUGH INPUT PERTURBATION

TECHNICAL FIELD

The present disclosure relates generally to processing systems and, more particularly, to one or more techniques for graphics processing in processing systems.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes a plurality of processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a graphics processing unit (GPU).

Typically, a GPU of a device is configured to perform every process in a graphics processing pipeline. However, with the advent of wireless communication and the streaming of content (e.g., game content or any other content that is rendered using a GPU), there has developed a need for distributed graphics processing. For example, there has developed a need to offload processing performed by a GPU of a first device (e.g., a client device, such as a game console, a virtual reality device, or any other device) to a second device (e.g., a server, such as a server hosting a mobile game).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a first apparatus are provided. The apparatus may be a GPU. In one aspect, the GPU may generate at least one first motion vector in a first subset of a frame, the first motion vector providing a first motion estimation for image data in the first subset of the frame. The GPU may also perturb the image data in the first subset of the frame. Additionally, the GPU may generate at least one second motion vector based on the perturbed image data, the second motion vector providing a second motion estimation for the image data in the first subset of the frame. Moreover, the GPU may compare the first motion vector and the second motion vector. Further, the GPU may determine at least one third motion vector for the motion estimation of the image data in the first subset of the frame based on the comparison between the first motion vector and the second motion vector.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
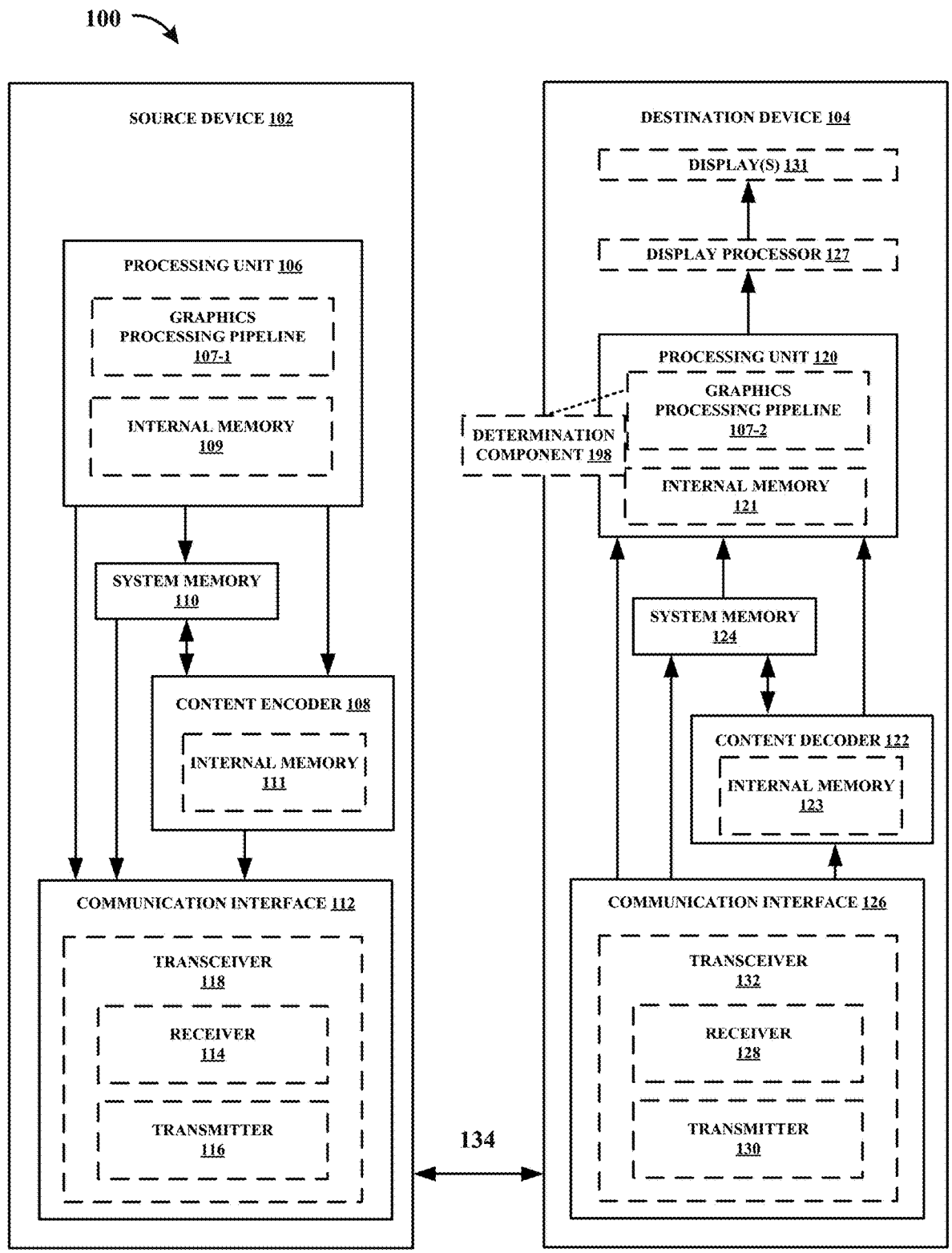
FIG. 1 is a block diagram that illustrates an example content generation and coding system in accordance with the techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems on a chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (i.e., software) being configured to perform one or more functions. In such examples, the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and executed the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a distributed graphics processing pipeline across multiple devices, improving the coding of graphical content, and/or reducing the load of a processing unit (i.e., any processing unit configured to perform one or more techniques described herein, such as a graphics processing unit (GPU)). For example, this disclosure describes techniques for graphics processing in communication systems. Other example benefits are described throughout this disclosure.

As used herein, the term "coder" may generically refer to an encoder and/or decoder. For example, reference to a "content coder" may include reference to a content encoder and/or a content decoder. Similarly, as used herein, the term "coding" may generically refer to encoding and/or decoding. As used herein, the terms "encode" and "compress" may be used interchangeably. Similarly, the terms "decode" and "decompress" may be used interchangeably.

As used herein, instances of the term "content" may refer to the term "video," "graphical content," "image," and vice versa. This is true regardless of whether the terms are being used as an adjective, noun, or other part of speech. For example, reference to a "content coder" may include reference to a "video coder," "graphical content coder," or "image coder,"; and reference to a "video coder," "graphical content coder," or "image coder" may include reference to a "content coder." As another example, reference to a processing unit providing content to a content coder may include reference to the processing unit providing graphical content to a video encoder. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (i.e., the frame includes two or more layers, and the frame that includes two or more layers may subsequently be blended)

As referenced herein, a first component (e.g., a processing unit) may provide content, such as graphical content, to a second component (e.g., a content coder). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

FIG. 1 is a block diagram that illustrates an example content generation and coding system 100 configured to implement one or more techniques of this disclosure. The content generation and coding system 100 includes a source device 102 and a destination device 104. In accordance with the techniques described herein, the source device 102 may be configured to encode, using the content encoder 108, graphical content generated by the processing unit 106 prior to transmission to the destination device 104. The content encoder 108 may be configured to output a bitstream having a bit rate. The processing unit 106 may be configured to control and/or influence the bit rate of the content encoder 108 based on how the processing unit 106 generates graphical content.

The source device 102 may include one or more components (or circuits) for performing various functions described herein. The destination device 104 may include one or more components (or circuits) for performing various functions described herein. In some examples, one or more components of the source device 102 may be components of a system on chip (SOC). Similarly, in some examples, one or more components of the destination device 104 may be components of an SOC.

The source device 102 may include one or more components configured to perform one or more techniques of this disclosure. In the example shown, the source device 102 may include a processing unit 106, a content encoder 108, a system memory 110, and a communication interface 112. The processing unit 106 may include an internal memory 109. The processing unit 106 may be configured to perform graphics processing, such as in a graphics processing pipeline 107-1. The content encoder 108 may include an internal memory 111.

Memory external to the processing unit 106 and the content encoder 108, such as system memory 110, may be accessible to the processing unit 106 and the content encoder 108. For example, the processing unit 106 and the content encoder 108 may be configured to read from and/or write to external memory, such as the system memory 110. The processing unit 106 and the content encoder 108 may be communicatively coupled to the system memory 110 over a bus. In some examples, the processing unit 106 and the content encoder 108 may be communicatively coupled to each other over the bus or a different connection.

The content encoder 108 may be configured to receive graphical content from any source, such as the system memory 110 and/or the processing unit 106. The system memory 110 may be configured to store graphical content generated by the processing unit 106. For example, the processing unit 106 may be configured to store graphical content in the system memory 110. The content encoder 108 may be configured to receive graphical content (e.g., from the system memory 110 and/or the processing unit 106) in the form of pixel data. Otherwise described, the content encoder 108 may be configured to receive pixel data of graphical content produced by the processing unit 106. For example, the content encoder 108 may be configured to receive a value for each component (e.g., each color component) of one or more pixels of graphical content. As an example, a pixel in the red (R), green (G), blue (B) (RGB) color space may include a first value for the red component, a second value for the green component, and a third value for the blue component.

The internal memory 109, the system memory 110, and/or the internal memory 111 may include one or more volatile or non-volatile memories or storage devices. In some examples, internal memory 109, the system memory 110, and/or the internal memory 111 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 109, the system memory 110, and/or the internal memory 111 may be a non-transitory storage medium according to some examples. The term "non-transitory" may indicate that the storage medium is not embodied in a carrier wave or a propagated signal. However, the term "non-transitory" should not be interpreted to mean that internal memory 109, the system memory 110, and/or the internal memory 111 is non-movable or that its contents are static. As one example, the system memory 110 may be removed from the source device 102 and moved to another device. As another example, the system memory 110 may not be removable from the source device 102.

The processing unit 106 may be a central processing unit (CPU), a graphics processing unit (GPU), a general purpose GPU (GPGPU), or any other processing unit that may be configured to perform graphics processing. In some examples, the processing unit 106 may be integrated into a motherboard of the source device 102. In some examples, the processing unit 106 may be may be present on a graphics card that is installed in a port in a motherboard of the source device 102, or may be otherwise incorporated within a peripheral device configured to interoperate with the source device 102.

The processing unit 106 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 106 may store instructions for the software in a suitable, non-transitory computer-readable storage medium (e.g., internal memory 109), and may execute the instructions in hardware using one or more processors to perform the techniques of this disclosure. Any of the foregoing (including hardware, software, a combination of hardware and software, etc.) may be considered to be one or more processors.

The content encoder 108 may be any processing unit configured to perform content encoding. In some examples, the content encoder 108 may be integrated into a motherboard of the source device 102. The content encoder 108 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content encoder 108 may store instructions for the software in a suitable, non-transitory computer-readable storage medium (e.g., internal memory 111), and may execute the instructions in hardware using one or more processors to perform the techniques of this disclosure. Any of the foregoing (including hardware, software, a combination of hardware and software, etc.) may be considered to be one or more processors.

The communication interface 112 may include a receiver 114 and a transmitter 116. The receiver 114 may be configured to perform any receiving function described herein with respect to the source device 102. For example, the receiver 114 may be configured to receive information from the destination device 104, which may include a request for content. In some examples, in response to receiving the request for content, the source device 102 may be configured to perform one or more techniques described herein, such as produce or otherwise generate graphical content for delivery to the destination device 104. The transmitter 116 may be configured to perform any transmitting function described herein with respect to the source device 102. For example, the transmitter 116 may be configured to transmit encoded content to the destination device 104, such as encoded graphical content produced by the processing unit 106 and the content encoder 108 (i.e., the graphical content is produced by the processing unit 106, which the content encoder 108 receives as input to produce or otherwise generate the encoded graphical content). The receiver 114 and the transmitter 116 may be combined into a transceiver 118. In such examples, the transceiver 118 may be configured to perform any receiving function and/or transmitting function described herein with respect to the source device 102.

The destination device 104 may include one or more components configured to perform one or more techniques of this disclosure. In the example shown, the destination device 104 may include a processing unit 120, a content decoder 122, a system memory 124, a communication interface 126, and one or more displays 131. Reference to the display 131 may refer to the one or more displays 131. For example, the display 131 may include a single display or a plurality of displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon.

The processing unit 120 may include an internal memory 121. The processing unit 120 may be configured to perform graphics processing, such as in a graphics processing pipeline 107-2. The content decoder 122 may include an internal memory 123. In some examples, the destination device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display content that was generated using decoded content. For example, the display processor 127 may be configured to process one or more frames generated by the processing unit 120, where the one or more frames are generated by the processing unit 120 by using decoded content that was derived from encoded content received from the source device 102. In turn the display processor 127 may be configured to perform display processing on the one or more frames generated by the processing unit 120. The one or more displays 131 may be configured to display or otherwise present frames processed by the display processor 127. In some examples, the one or more display devices may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content decoder 122, such as system memory 124, may be accessible to the processing unit 120 and the content decoder 122. For example, the processing unit 120 and the content decoder 122 may be configured to read from and/or write to external memory, such as the system memory 124. The processing unit 120 and the content decoder 122 may be communicatively coupled to the system memory 124 over a bus. In some examples, the processing unit 120 and the content decoder 122 may be communicatively coupled to each other over the bus or a different connection.

The content decoder 122 may be configured to receive graphical content from any source, such as the system memory 124 and/or the communication interface 126. The system memory 124 may be configured to store received encoded graphical content, such as encoded graphical content received from the source device 102. The content decoder 122 may be configured to receive encoded graphical content (e.g., from the system memory 124 and/or the communication interface 126) in the form of encoded pixel data. The content decoder 122 may be configured to decode encoded graphical content.

The internal memory 121, the system memory 124, and/or the internal memory 123 may include one or more volatile or non-volatile memories or storage devices. In some examples, internal memory 121, the system memory 124, and/or the internal memory 123 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 121, the system memory 124, and/or the internal memory 123 may be a non-transitory storage medium according to some examples. The term "non-transitory" may indicate that the storage medium is not embodied in a carrier wave or a propagated signal. However, the term "non-transitory" should not be interpreted to mean that internal memory 121, the system memory 124, and/or the internal memory 123 is non-movable or that its contents are static. As one example, the system memory 124 may be removed from the destination device 104 and moved to another device. As another example, the system memory 124 may not be removable from the destination device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the destination device 104. In some examples, the processing unit 120 may be may be present on a graphics card that is installed in a port in a motherboard of the destination device 104, or may be otherwise incorporated within a peripheral device configured to interoperate with the destination device 104.

The processing unit 120 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium (e.g., internal memory 121), and may execute the instructions in hardware using one or more processors to perform the techniques of this disclosure. Any of the foregoing (including hardware, software, a combination of hardware and software, etc.) may be considered to be one or more processors.

The content decoder 122 may be any processing unit configured to perform content decoding. In some examples, the content decoder 122 may be integrated into a motherboard of the destination device 104. The content decoder 122 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content decoder 122 may store instructions for the software in a suitable, non-transitory computer-readable storage medium (e.g., internal memory 123), and may execute the instructions in hardware using one or more processors to perform the techniques of this disclosure. Any of the foregoing (including hardware, software, a combination of hardware and software, etc.) may be considered to be one or more processors.

The communication interface 126 may include a receiver 128 and a transmitter 130. The receiver 128 may be configured to perform any receiving function described herein with respect to the destination device 104. For example, the receiver 128 may be configured to receive information from the source device 102, which may include encoded content, such as encoded graphical content produced or otherwise generated by the processing unit 106 and the content encoder 108 of the source device 102 (i.e., the graphical content is produced by the processing unit 106, which the content encoder 108 receives as input to produce or otherwise generate the encoded graphical content). As another example, the receiver 114 may be configured to receive position information from the destination device 104, which may be encoded or unencoded (i.e., not encoded). Additionally, the receiver 128 may be configured to receive position information from the source device 102. In some examples, the destination device 104 may be configured to decode encoded graphical content received from the source device 102 in accordance with the techniques described herein. For example, the content decoder 122 may be configured to decode encoded graphical content to produce or otherwise generate decoded graphical content. The processing unit 120 may be configured to use the decoded graphical content to produce or otherwise generate one or more frames for presentment on the one or more displays 131. The transmitter 130 may be configured to perform any transmitting function described herein with respect to the destination device 104. For example, the transmitter 130 may be configured to transmit information to the source device 102, which may include a request for content. The receiver 128 and the transmitter 130 may be combined into a transceiver 132. In such examples, the transceiver 132 may be configured to perform any receiving function and/or transmitting function described herein with respect to the destination device 104.

The content encoder 108 and the content decoder 122 of content generation and coding system 100 represent examples of computing components (e.g., processing units) that may be configured to perform one or more techniques for encoding content and decoding content in accordance with various examples described in this disclosure, respectively. In some examples, the content encoder 108 and the content decoder 122 may be configured to operate in accordance with a content coding standard, such as a video coding standard, a display stream compression standard, or an image compression standard.

As shown in FIG. 1, the source device 102 may be configured to generate encoded content. Accordingly, the source device 102 may be referred to as a content encoding device or a content encoding apparatus. The destination device 104 may be configured to decode the encoded content generated by source device 102. Accordingly, the destination device 104 may be referred to as a content decoding device or a content decoding apparatus. In some examples, the source device 102 and the destination device 104 may be separate devices, as shown. In other examples, source device 102 and destination device 104 may be on or part of the same computing device. In either example, a graphics processing pipeline may be distributed between the two devices. For example, a single graphics processing pipeline may include a plurality of graphics processes. The graphics processing pipeline 107-1 may include one or more graphics processes of the plurality of graphics processes. Similarly, graphics processing pipeline 107-2 may include one or more processes graphics processes of the plurality of graphics processes. In this regard, the graphics processing pipeline 107-1 concatenated or otherwise followed by the graphics processing pipeline 107-2 may result in a full graphics processing pipeline. Otherwise described, the graphics processing pipeline 107-1 may be a partial graphics processing pipeline and the graphics processing pipeline 107-2 may be a partial graphics processing pipeline that, when combined, result in a distributed graphics processing pipeline.

Referring again to FIG. 1, in certain aspects, the graphics processing pipeline 107-2 may include a generation component configured to generate at least one first motion vector in a first subset of a frame, the first motion vector providing a first motion estimation for image data in the first subset of the frame. The graphics processing pipeline 107-2 may also include a perturbation component configured to perturb the image data in the first subset of the frame. Further, the generation component may be configured to generate at least one second motion vector based on the perturbed image data in the first subset of the frame, the second motion vector providing a second motion estimation for the image data in the first subset of the frame. The graphics processing pipeline 107-2 may also include a comparison component configured to compare the first motion vector and the second motion vector. Moreover, the graphics processing pipeline 107-2 may include a determination component 198 configured to determine at least one third motion vector for the motion estimation of the image data in the first subset of the frame based on the comparison between the first motion vector and the second motion vector. By distributing the graphics processing pipeline between the source device 102 and the destination device 104, the destination device may be able to, in some examples, present graphical content that it otherwise would not be able to render; and, therefore, could not present. Other example benefits are described throughout this disclosure.

As described herein, a device, such as the source device 102 and/or the destination device 104, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, an augmented reality device, a virtual reality device, a display (e.g., display device), a television, a television set-top box, an intermediate network device, a digital media player, a video streaming device, a content streaming device, an in-car computer, any mobile device, any device configured to generate graphical content, or any device configured to perform one or more techniques described herein.

Source device 102 may be configured to communicate with the destination device 104. For example, destination device 104 may be configured to receive encoded content from the source device 102. In some example, the communication coupling between the source device 102 and the destination device 104 is shown as link 134. Link 134 may comprise any type of medium or device capable of moving the encoded content from source device 102 to the destination device 104.

In the example of FIG. 1, link 134 may comprise a communication medium to enable the source device 102 to transmit encoded content to destination device 104 in real-time. The encoded content may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 102 to the destination device 104. In other examples, link 134 may be a point-to-point connection between source device 102 and destination device 104, such as a wired or wireless display link connection (e.g., an HDMI link, a DisplayPort link, MIPI DSI link, or another link over which encoded content may traverse from the source device 102 to the destination device 104.

In another example, the link 134 may include a storage medium configured to store encoded content generated by the source device 102. In this example, the destination device 104 may be configured to access the storage medium. The storage medium may include a variety of locally-accessed data storage media such as Blu-ray discs, DVDs, CD-ROMs, flash memory, or other suitable digital storage media for storing encoded content.

In another example, the link 134 may include a server or another intermediate storage device configured to store encoded content generated by the source device 102. In this example, the destination device 104 may be configured to access encoded content stored at the server or other intermediate storage device. The server may be a type of server capable of storing encoded content and transmitting the encoded content to the destination device 104.

Devices described herein may be configured to communicate with each other, such as the source device 102 and the destination device 104. Communication may include the transmission and/or reception of information. The information may be carried in one or more messages. As an example, a first device in communication with a second device may be described as being communicatively coupled to or otherwise with the second device. For example, a client device and a server may be communicatively coupled. As another example, a server may be communicatively coupled to a plurality of client devices. As another example, any device described herein configured to perform one or more techniques of this disclosure may be communicatively coupled to one or more other devices configured to perform one or more techniques of this disclosure. In some examples, when communicatively coupled, two devices may be actively transmitting or receiving information, or may be configured to transmit or receive information. If not communicatively coupled, any two devices may be configured to communicatively couple with each other, such as in accordance with one or more communication protocols compliant with one or more communication standards. Reference to "any two devices" does not mean that only two devices may be configured to communicatively couple with each other; rather, any two devices is inclusive of more than two devices. For example, a first device may communicatively couple with a second device and the first device may communicatively couple with a third device. In such an example, the first device may be a server.

With reference to FIG. 1, the source device 102 may be described as being communicatively coupled to the destination device 104. In some examples, the term "communicatively coupled" may refer to a communication connection, which may be direct or indirect. The link 134 may, in some examples, represent a communication coupling between the source device 102 and the destination device 104. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. Two devices that are communicatively coupled may communicate with each other over one or more different types of networks (e.g., a wireless network and/or a wired network) in accordance with one or more communication protocols. In some examples, two devices that are communicatively coupled may associate with one another through an association process. In other examples, two devices that are communicatively coupled may communicate with each other without engaging in an association process. For example, a device, such as the source device 102, may be configured to unicast, broadcast, multicast, or otherwise transmit information (e.g., encoded content) to one or more other devices (e.g., one or more destination devices, which includes the destination device 104). The destination device 104 in this example may be described as being communicatively coupled with each of the one or more other devices. In some examples, a communication connection may enable the transmission and/or receipt of information. For example, a first device communicatively coupled to a second device may be configured to transmit information to the second device and/or receive information from the second device in accordance with the techniques of this disclosure. Similarly, the second device in this example may be configured to transmit information to the first device and/or receive information from the first device in accordance with the techniques of this disclosure. In some examples, the term "communicatively coupled" may refer to a temporary, intermittent, or permanent communication connection.

Any device described herein, such as the source device 102 and the destination device 104, may be configured to operate in accordance with one or more communication protocols. For example, the source device 102 may be configured to communicate with (e.g., receive information from and/or transmit information to) the destination device 104 using one or more communication protocols. In such an example, the source device 102 may be described as communicating with the destination device 104 over a connection. The connection may be compliant or otherwise be in accordance with a communication protocol. Similarly, the destination device 104 may be configured to communicate with (e.g., receive information from and/or transmit information to) the source device 102 using one or more communication protocols. In such an example, the destination device 104 may be described as communicating with the source device 102 over a connection. The connection may be compliant or otherwise be in accordance with a communication protocol.

As used herein, the term "communication protocol" may refer to any communication protocol, such as a communication protocol compliant with a communication standard or the like. As used herein, the term "communication standard" may include any communication standard, such as a wireless communication standard and/or a wired communication standard. A wireless communication standard may correspond to a wireless network. As an example, a communication standard may include any wireless communication standard corresponding to a wireless personal area network (WPAN) standard, such as Bluetooth (e.g., IEEE 802.15), Bluetooth low energy (BLE) (e.g., IEEE 802.15.4). As another example, a communication standard may include any wireless communication standard corresponding to a wireless local area network (WLAN) standard, such as WI-FI (e.g., any 802.11 standard, such as 802.11a, 802.11b, 802.11c, 802.11n, or 802.11ax). As another example, a communication standard may include any wireless communication standard corresponding to a wireless wide area network (WWAN) standard, such as 3G, 4G, 4G LTE, or 5G.

With reference to FIG. 1, the content encoder 108 may be configured to encode graphical content. In some examples, the content encoder 108 may be configured to encode graphical content as one or more video frames. When the content encoder 108 encodes content, the content encoder 108 may generate a bitstream. The bitstream may have a bit rate, such as bits/time unit, where time unit is any time unit, such as second or minute. The bitstream may include a sequence of bits that form a coded representation of the graphical content and associated data. To generate the bitstream, the content encoder 108 may be configured to perform encoding operations on pixel data, such as pixel data corresponding to a shaded texture atlas. For example, when the content encoder 108 performs encoding operations on image data (e.g., one or more blocks of a shaded texture atlas) provided as input to the content encoder 108, the content encoder 108 may generate a series of coded images and associated data. The associated data may include a set of coding parameters such as a quantization parameter (QP).

Motion estimation is the process of analyzing multiple two dimensional (2D) images and producing motion vectors which describe the movement of regions from one image to the other. Essentially, motion estimation produces motion vectors that can describe how objects move within certain sections of an image. Motion vectors have a variety of uses including video compression, post-processing effects, such as motion blur, and frame extrapolation or interpolation. In order to lighten the rendering workload put on a GPU, virtual reality (VR) or augmented reality (AR) systems can utilize motion estimation in order to extrapolate frames from previously rendered content. By doing so, this may allow the GPU to render frames at a reduced rate, with the extrapolated frames being displayed to the user in the place of rendered content. Motion estimation can be useful because in VR or AR systems there is a strong drive to reduce the rendering workload, e.g., at the GPU. The present disclosure can reduce the rendering workload by rendering fewer frames on the GPU and using the motion estimation to fill the gaps in the images or motion vectors. Additionally, while motion estimation can be performed with video content, the motion estimation described herein can utilize rendered content that is being rendered in real time on the GPU.

In some instances, repeating patterns in the input images may be difficult for motion estimation to handle. For example, rendered content has repeating patterns more frequently than other content, e.g., photo content, because rendered content uses textured mapping with repeating patterns. In some aspects, motion estimation techniques can have trouble with repeating patterns because these techniques are trying to match objects moving from one frame to another frame. Because rendered content may repeat patterns exactly during some instances, there may be false motion matches where the motion estimation incorrectly attempts to match motion. For example, the motion estimation can skip a motion cycle because of repeated patterns and cause an incorrect mapping to the next element and produce an incorrect motion estimation. Additionally, as many regions of an image may match equally well, it can be difficult for some systems to properly identify motion. Erroneous motion vectors can be produced in these regions of incorrect motion estimation, which can lead to a significant corruption in use cases that rely on accurate motion identification. As rendered content may contain liberal use of repeating textures and patterns, incorrect motion estimation may be a growing issue as rendered content motion estimation use cases increase.

Some aspects of the present disclosure can provide a method for identifying erroneous motion vectors. By properly identifying erroneous motions vectors, they can be removed to produce a more accurate motion estimation. In some aspects, motion estimation according to the present disclosure can be in addition to, or sit on top of, the general motion estimation process. Accordingly, some aspects of the present disclosure can perform a motion estimation process multiple times, e.g., twice. In these instances, the motion estimation can be performed through input perturbation, which can lead to an overall improvement in motion estimation. This motion estimation with input perturbation can be performed two times, wherein one pass can be performed on the original input images and a second pass can be performed on a perturbed version of the input images. In some aspects, the first pass can be an unperturbed or strict pass by sending the input image and producing the resulting motion vectors. The second pass can be a perturbation pass, wherein the motion vectors for the input image are perturbed in some manner. When both passes are complete, the resulting motion vectors can be compared to determine the real motion and the invalid motion, e.g., caused by the repeating patterns. In some instances, the first pass and the second pass can be performed at the same time or in parallel. The resulting vectors that match between the original and perturbed passes are identified as valid, and vectors which do not match are discarded as invalid.

The present disclosure can perform input perturbation in a number of manners. In some aspects, the present disclosure can introduce enough new irregularity into an image that it can disrupt the motion estimation. For example, by introducing new irregularities into the motion vectors, the motion estimation can affect motion vectors in certain areas of the input image, e.g., the repeating pattern areas. In some instances, this irregularity can be a delta or differential value of the motion vectors. In these instances, there should not be so much delta or differential that the motion tracking on the real objects is lost. Accordingly, the present disclosure can find a balance between adding enough noise to perturb the input images, but not so much that real motion is affected. As mentioned supra, the present disclosure can compare the two passes, e.g., the unperturbed pass and the perturbation pass. Areas where the motion estimation does not line up between the two passes can be identified as irrelevant or erroneous motion vectors. In some examples, there may be too much perturbation such that the motion estimation is dramatically altered to the point of affecting the actual motion. Indeed, too much perturbation may cause the motion in some of the input image regions to not actually follow real motion, but some artifact of a false repeating pattern.

Figure 2:
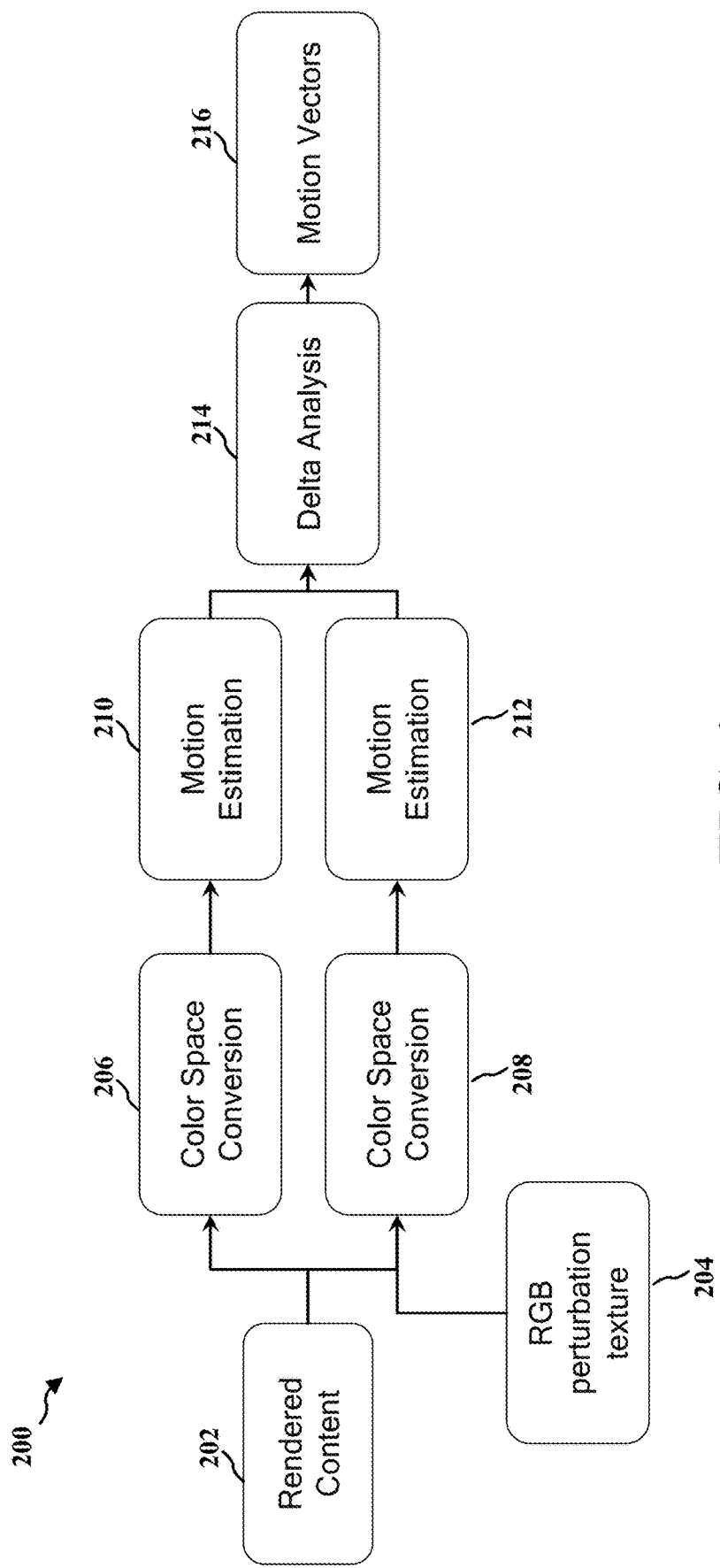
FIG. 2 illustrates an example of motion estimation according to the present disclosure.

FIG. 2 illustrates an example of motion estimation 200 according to the present disclosure. FIG. 2 displays that a rendered content block 202 and an RGB perturbation texture block 204 can both be inputs to color space conversion passes 206 and 208. As shown in FIG. 2, the color space conversions 206 and 208 can lead to motion estimations 210 and 212, which can lead to a delta or differential analysis 214, and can then lead to motion vector calculation 216. The color space conversion 206/208 in FIG. 2 can take into account the aforementioned perturbation when converting to luminance (Y), first chrominance (U), and second chrominance (V) (YUV) values. The conversion from RGB to YUV can be an efficient way to perform the perturbation on a GPU. As shown in FIG. 2, some aspects can first sample the rendered content, then perturb the RGB values, and then perform the YUV conversion based on these values. Some aspects of the present disclosure may not be concerned with what type of YUV conversion is used. For instance, the type of YUV conversion may depend on the YUV standard being followed. In other aspects, this conversion can be done outside of color space conversion by calculating the noise pixel-by-pixel. Also, an efficient way perform the perturbation may be to input the noise as another texture.

In some aspects, the perturbation can allow the GPU to determine motion vectors and then render a subsequent frame. Effective perturbation can modify the input enough to disrupt the false region or feature matches due to repeating patterns, but may not impact the input to the extent that the identification of real motion is impaired. In some aspects of the present disclosure, the motion estimation path for a VR or AR framework performing frame extrapolation can be exercised on certain platforms, e.g., a SDM845 platform. As mentioned above, the method used to perform the perturbations can be a color space conversion. Rendered content can typically be in an RGB color space and the motion estimation can be in a YUV color space. Accordingly, before the present disclosure performs a motion estimation, a color space conversion may be performed. For example, the color space conversion can be performed on a GPU during the first or unperturbed pass. The present disclosure can also sample a texture that contains the values for how the input will be perturbed. Accordingly, the present disclosure can perform this modification during the color space conversion, and then proceed to perform the motion estimation.

In some instances, the aforementioned perturbation can be accomplished by passing an additional noise texture to the existing RGB to YUV conversion, e.g., by using a conversion shader which applies a certain magnitude of uniformly distributed random RGB values. In some aspects, the magnitude can be additive to each color channel of the input image prior to the color space conversion. In some aspects, within the color space conversion, the additive noise can be performed and then the color space conversion can be performed on the modified values. The conversion shader can apply a number of different magnitudes, e.g., a 5% magnitude. The magnitude value can be pre-determined or arrived at through experimentation by determining when the noise may eliminate too many legitimate vectors. Indeed, this magnitude value may be flexible, as the same magnitude value may not apply well to each and every image.

In some aspects, rather than just applying a constant magnitude of noise, the magnitude may be altered based on the variance of the input image. For example, if there is an input image with high contrast regions in particular areas, the present disclosure can apply a higher degree of noise texture. In other examples, if there is an image with low variance and softer features, the present disclosure can apply a lower level of noise in the perturbed pass. Some aspects of the present disclose may obtain improved results when varying the magnitude of noise based on the variance of the image. For instance, if the present disclosure determines the variance of a region and uses that to determine amount of noise to apply, then an improved motion estimation may be obtained. Accordingly, by measuring the variance of each local region of an image, and using that to determine how much noise to apply, the present disclosure can improve the ability to detect erroneous motion vectors and reduce the likelihood of accidentally discarding real motion. Indeed, the present disclosure may obtain more effective results with more or less noise based on the actual input image.

As mentioned above, the amount of variance applied by the present disclosure may be content dependent. If too much noise is applied, then the feature recognition of actual features may be disrupted. In some examples, a 10% magnitude of noise may be too high depending on the content of the image. For instance, by applying too much noise in a certain area, the result may be too many erroneous motion vectors in that area. There can also be some legitimate motion vectors identified as erroneous as the noise starts to interfere with the actual object tracking. Therefore, if too much perturbation is applied, then the actual object tracking may be disrupted. For example, applying too much noise may cause some areas on the input image with legitimate movement to not match, e.g., the delta or differential may be too high, which may result in an erroneous conclusion that legitimate motion vectors are erroneous vectors. Put simply, if the noise amount is too high with too much modification, the amount of noise may be too varied from the actual vectors, and the noise will drown out the real features. Accordingly, the present disclosure can assess the input images in order to properly vary the amount of perturbation to be applied. Indeed, some aspects of the present disclosure can adjust the amount of noise or perturbation applied to motion vectors based on the specific content of the input image.

Figure 3B:
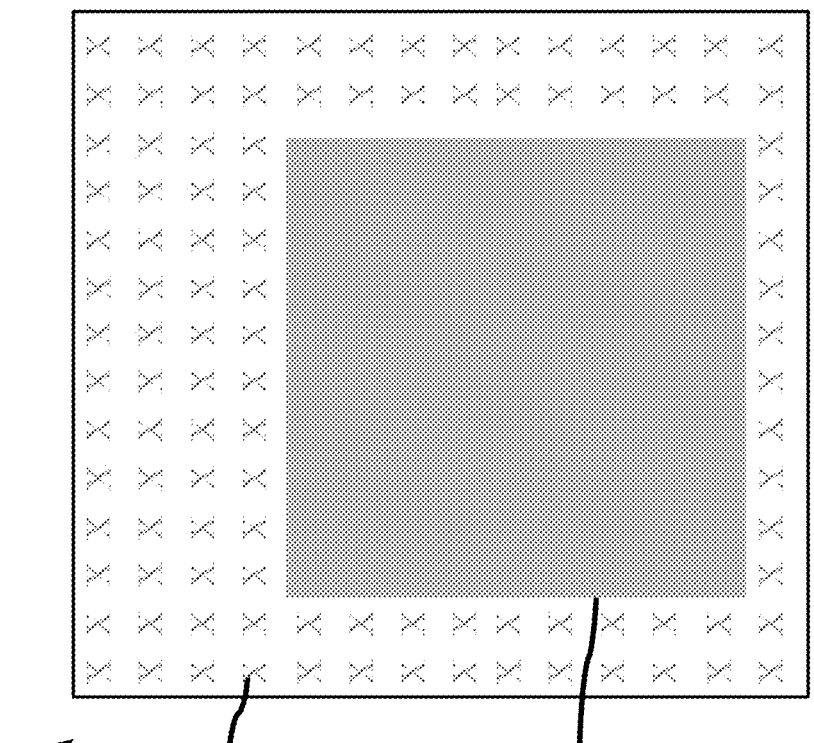
FIGS. 3A and 3B illustrate an example of an image on which motion estimation is performed according to the present disclosure.
Figure 3A:
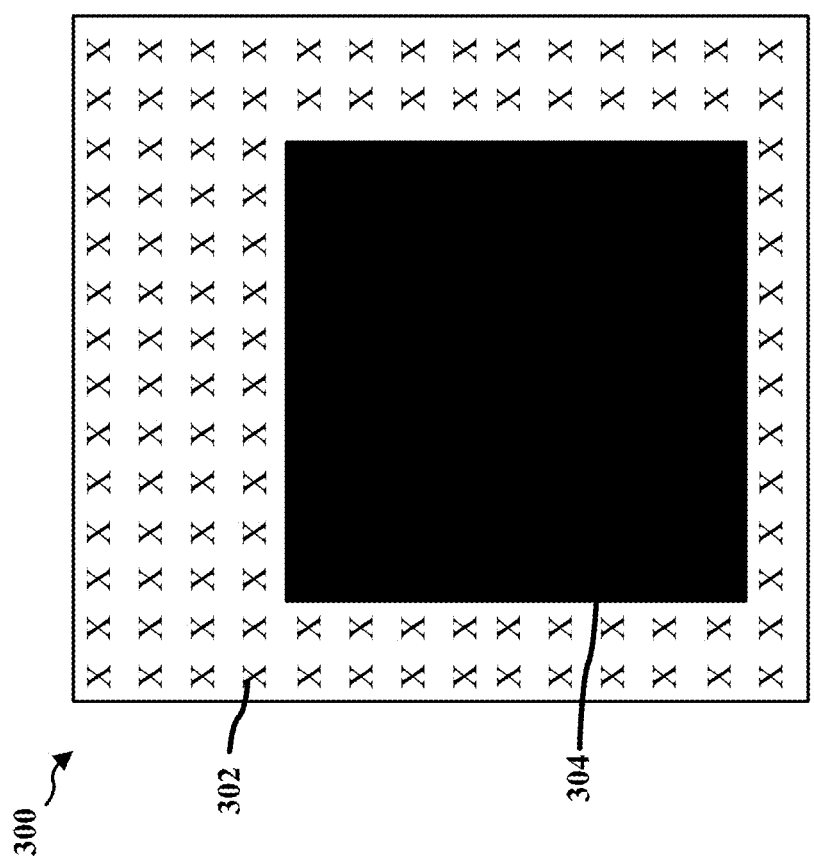

FIGS. 3A and 3B illustrate images 300 and 310, respectively, on which motion estimation is performed. As motion estimation can be performed on images 300 or 310, these images can be referred to as motion estimations or motion estimation images. As displayed in FIG. 3A, image 300 includes repeating background 302 and inset textured image 304. In some aspects, the repeating background 302 can be stationary. The inset textured image 304 can move in a number of different directions, e.g., in a direction across repeating background 302. Image 300 illustrates one example of motion estimation according to the present disclosure that can be performed on a hardware platform, e.g., a SDM845 platform.

In some aspects, image 300 can include a strict or unperturbed pass by processing the input image or inset textured image 304 and obtaining the resulting motion vectors. In these aspects, the 'X's in the repeating background 302 might appear as if they are shifting to the right or left because they will matchup with other 'X's to the right or left. In other aspects, image 300 can include a perturbation pass, wherein the motion vectors for the input image or inset textured image 304 are perturbed in some manner and result in a perturbed image. In these aspects, the input image or inset textured image 304 may be moved, e.g., slightly to the right or left, to produce a perturbed image, such that it may be less likely to get the same 'X' matches in the repeating background 302. For instance, when image 304 is perturbed to produce a perturbed image, there may be different incorrect 'X' matches than with a strict or unperturbed pass.

FIG. 3B displays image 310 that is the result of a perturbation pass. For example, image 310 can be the result of a perturbation being applied to image 300 in FIG. 3A. In FIG. 3B, the perturbation in image 310 is shown by the repeating background 312 and inset textured image 314 appearing to be gray in color. In contrast, FIG. 3A displays that prior to the perturbation pass repeating background 302 and inset textured image 304 appear as black. Indeed, during the perturbation pass, the entire image 300 can be perturbed, which can result in the entire image 310 being perturbed, e.g., appearing as gray instead of black. The result of the perturbation to an image can be manifested in a variety of manners, e.g., the image changing or fading in color. For instance, image 310 can be faded in color as compared to image 300. In some aspects, the result of the perturbation can be applied to the entire image. In other aspects, the result of the perturbation may be applied to a particular portion of the image.

In some aspects, when the 'X' values in an image are perturbed or shaken up by the perturbation, it is more likely that a background 'X' will move in a different direction and not match the previous pass. By doing so, the present disclosure can compare the delta or differential between the strict pass and the perturbation pass. Essentially, the present disclosure can compare the common motion vectors between the strict pass and the perturbation pass. These common motion vectors may likely correspond to the true object motion. The present disclosure can also make more than two passes, such that there may be multiple passes in addition to the strict pass and the perturbation pass. Further, when more than two passes are performed, multiple passes may be performed in parallel. While performing more than two passes may provide a better estimation, overhead costs may place a limit on the amount of passes that can be performed.

As mentioned supra, some examples of the present disclosure may not render every frame. For example, GPUs according to the present disclosure can render every other frame and still utilize the motion vectors of the rendered content. In some aspects, GPUs may be limited on resources because of the demands of a VR rendering, so not rendering every frame may save the GPU resources and achieve a particular frame rate by offloading rendering work from the GPU. As mentioned previously, the present disclosure may use the motion vectors and resulting motion estimation as a substitute or stand-in for rendering every frame. By doing so, the present disclosure can save power and performance at the GPU. Moreover, this may allow the present disclosure to render more high quality frames at the GPU.

In some aspects of the present disclosure, when motion estimation is performed, a single vector solution may be the result. In these instances, a threshold can be set for the amount of deviation between the unperturbed or strict pass and the perturbed pass to determine if it a certain vector is legitimate or erroneous. As mentioned above, this can be referred to as calculating the delta or differential, and the delta or differential value can be set it to any preferred value. In one example of using delta for calculating motion estimation, if the difference between passes for a certain vector is less than delta, it can be assumed that the vector is the motion vector from the unperturbed pass. In another example, if the difference between passes for a certain vector is greater than the delta, it can be assumed that there is zero motion. Aspects of the present disclosure can also compare the neighboring vectors and determine their motion. Some aspects of the present disclosure can also assume that it is preferred to not have any motion estimate compared to having an incorrect estimate. Essentially, an assumption can be made that no motion estimation is preferred over incorrect estimation.

The present disclosure can provide a number of different methods of applying perturbation to motion estimation. For example, as mentioned above, the variance may contain the local image variance calculated from the input frame data. In some aspects, variance can be produced as an additional data stream during motion estimation. Accordingly, the variance data for the perturbed motion estimation pass can be taken from the unperturbed motion estimation pass. Further, the variance data for the perturbed motion estimation pass can be approximated by utilizing a previous frame's variance data. In some aspects, this can be done to avoid losing parallelism on the motion estimation passes for the current frame.

Some aspects of the present disclosure can provide a shader which applies the aforementioned noise perturbation. For example, the present disclosure may use the following code for these types of shaders:

```
#version 300 es
#extension GL_EXT_YUV_target: require
uniform sampler2DArray texArray;
uniform sampler2D noiseTexture;
uniform float perturbationFactor;
in vec3 tc;
layout (yuv) out vec3 fragColor;
void main(void)
{
    vec3 color = texture(texArray, tc).xyz;
    fragColor = rgb_2_yuv(color + (texture(noiseTexture,
  tc.xy).xyz * perturbationFactor), itu_601);
}
```

In the example code above, texArray can be the input image, noiseTexture can be the noise perturbation texture, perturbationFactor can be the scale factor on the amount of perturbation applied, vec3 tc can be the input image texture coordinate, and fragColor can be the output fragment color.

The present disclosure can also provide a shader which applies the noise perturbation with local variance taken into consideration. For example, the present disclosure may use the following code for these types of shaders:

```
#version 300 es
#extension GL_EXT_YUV_target: require
uniform sampler2DArray texArray;
uniform sampler2D noiseTexture;
uniform sampler2D varianceTexture;
uniform vec2 varianceSampleRange;
uniform vec2 varianceSampleSpread;
uniform float perturbationFactor;
in vec3 tc;
layout (yuv) out vec3 fragColor;
void main(void)
{
    vec3 color = texture(texArray, tc).xyz;
    float varianceFactor = 0.0;
    for (int i = -1 * varianceSampleRange.x; i < varianceSampleRange.x, i++)
    {
        for (int j = -1 * varianceSampleRange.y; j < varianceSampleRange.y, j++)
        {
            vec2 sampleLocation;
            sampleLocation.x = tc.x + (varianceSampleSpread.x * i);
            sampleLocation.y = tc.y + (varianceSampleSpread.y * j);
            varianceFactor + = texture(varianceTexture, sampleLocation.xy).x;
        }
    }
    varianceFactor = varianceFactor/((varianceSampleRange.x*2)*
(varianceSampleRange.y* 2));
    fragColor = rgb_2_yuv(color + (texture(noiseTexture, tc.xy).xyz*
perturbationFactor * varianceFactor), itu_601);
}
```

In the example code above, texArray can be the input image, noiseTexture can be the noise perturbation texture, varianceTexture can be the variance data texture, varianceSampleRange can be the size of the region of the variance texture to sample, varianceSampleSpread can be the distance between variance texture sample positions, perturbationFactor can be the scale factor on the amount of perturbation applied, vec3 tc can be the input image texture coordinate, and fragColor can be the output fragment color.

the use case's tolerance for incorrect motion estimation. As mentioned above, in use cases utilizing a prototype VR, it can be better to produce no motion estimation rather than incorrect motion estimation. Accordingly, some aspects of the present disclosure may set the threshold to a very small value, e.g., 0.001. The present disclosure may use the following code to processes the two arrays of motion vectors to detect deviation:

```
for (int loopY = 0; loopY < arrayHeight; loopY++)
{
    for (int loopX = 0; loopX < arrayWidth; loopX++)
    {
        float Xa = motion VectorsUnperturbed[(loopY * arrayWidth) +
loopX].xMagnitude;
        float Xb = motion VectorsPerturbed[(loopY * arrayWidth) +
loopX].xMagnitude;
        float Ya = motion VectorsUnperturbed[(loopY * arrayWidth) +
loopX].yMagnitude;
        float Yb = motion VectorsPerturbed[(loopY * arrayWidth) +
loopX].yMagnitude;
        if (((fabs(Xa) - fabs(Xb)) > threshold) ||
            ((fabs(Ya) - fabs(Yb)) > threshold))
        {
            finalMotionVectors[(loopY * arrayWidth) + loopX].xMagnitude = 0;
            finalMotionVectors[(loopY * arrayWidth) + loopX].yMagnitude = 0;
        }
        else
        {
            finalMotionVectors[(loopY * arrayWidth) + loopX].xMagnitude =
motionVectorsUnperturbed[(loopY * arrayWidth) + loopX].xMagnitude;
            finalMotionVectors[(loopY * arrayWidth) + loopX].yMagnitude =
motionVectorsUnperturbed[(loopY * arrayWidth) + loopX].yMagnitude;
        }
    }
}
```

Figure 4A:
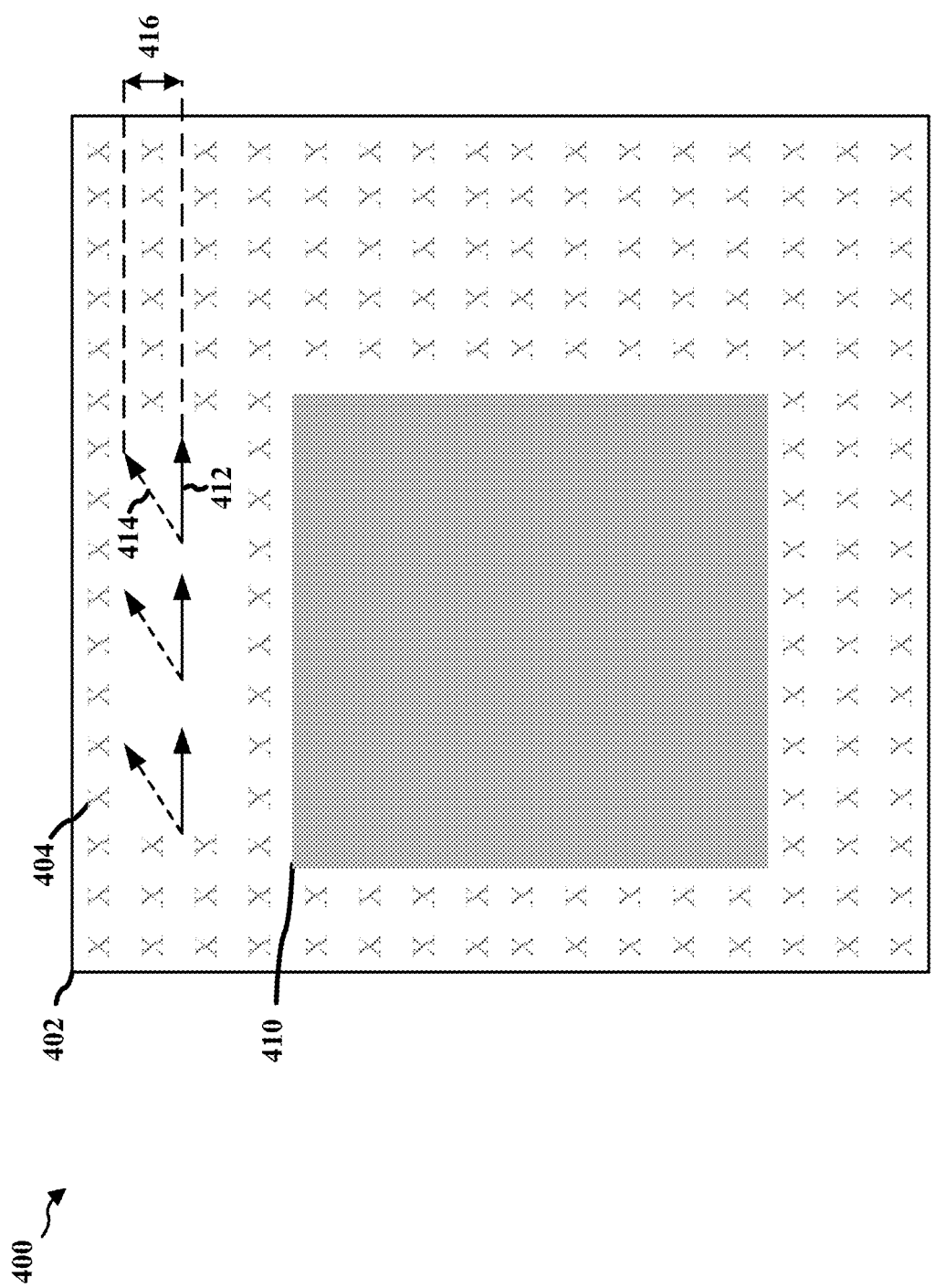
FIG. 4A illustrates another example of motion estimation according to the present disclosure.

The present disclosure can also process two arrays of motion vectors to detect deviation. For instance, the resulting motion vectors from the aforementioned two passes can be compared and utilized. In some aspects, the threshold can be a use case-specific tuning parameter that is set based on FIG. 4A illustrates another example of motion estimation 400 according to the present disclosure. As displayed in FIG. 4A, motion estimation 400 includes frame 402, repeating background 404, inset textured image 410, at least one first motion vector 412, at least one second motion vector 414, and difference 416 between the at least one first motion vector 412 and the at least one second motion vector 414. As shown in FIG. 4A, in some aspects, at least one first motion vector 412 can be generated in a first frame subset of frame 402. As shown in FIG. 4A, in some aspects, the first frame subset can be located above the inset textured image 410 in a portion of repeating background 404. In other aspects, the first frame subset can be located in another portion of frame 402. The at least one first motion vector 412 can provide a first motion estimation for image data in the first frame subset. In some aspects, the image data in the first frame subset can be perturbed. Also, at least one second motion vector 414 can be generated based on the perturbed image data in the first frame subset. The at least one second motion vector 414 can provide a second motion estimation for the image data in the first frame subset. Additionally, the at least one first motion vector 412 and the at least one second motion vector 414 can be compared. In some aspects, comparing the at least one first motion vector 412 and the at least one second motion vector 414 can comprise determining a difference 416 between the at least one first motion vector 412 and the at least one second motion vector 414. The difference 416 can be determined to be less than or greater than a threshold. In some aspects, the above comparison can be expressed as a function, e.g., the formula: $f(v_1, v_2) = |v_1 - v_2| <$ threshold.

In some aspects, at least one third motion vector can be determined for the motion estimation of the image data in the first frame subset based on the comparison between the at least one first motion vector 412 and the at least one second motion vector 414. Further, the at least one third motion vector can be set to be the at least one first motion vector 412 when the difference 416 is less than the threshold. The difference 416 can also be referred to as a delta analysis. As mentioned herein, in some aspects, the difference 416 can be an absolute value. Based on the above, the at least one third vector can be expressed as the following formula: $v_3 = v_1$, when $|v_1 - v_2| <$ threshold. In some aspects, the at least one third motion vector can be set to have a motion value of zero when the difference 416 is greater than or equal to the threshold. Based on this, the at least one third vector can also be expressed as the formula: $v_3 = 0$, when $|v_1 - v_2| \geq$ threshold.

In some instances, a second difference can be determined between the at least one third motion vector and one or more neighboring vectors around or in close proximity to the at least one third motion vector. In these instances, as shown in FIG. 4A, one or more neighboring vectors that are in close proximity to or around the third motion vector can be used to determine a second difference between the third motion vector and the neighboring vectors. Additionally, the at least one third motion vector can be set based upon the one or more neighboring vectors if the difference is greater than the threshold and/or the second difference is less than the threshold. Moreover, the aforementioned threshold can be based on a motion estimation tolerance for image data in the first frame subset.

Figure 4B:
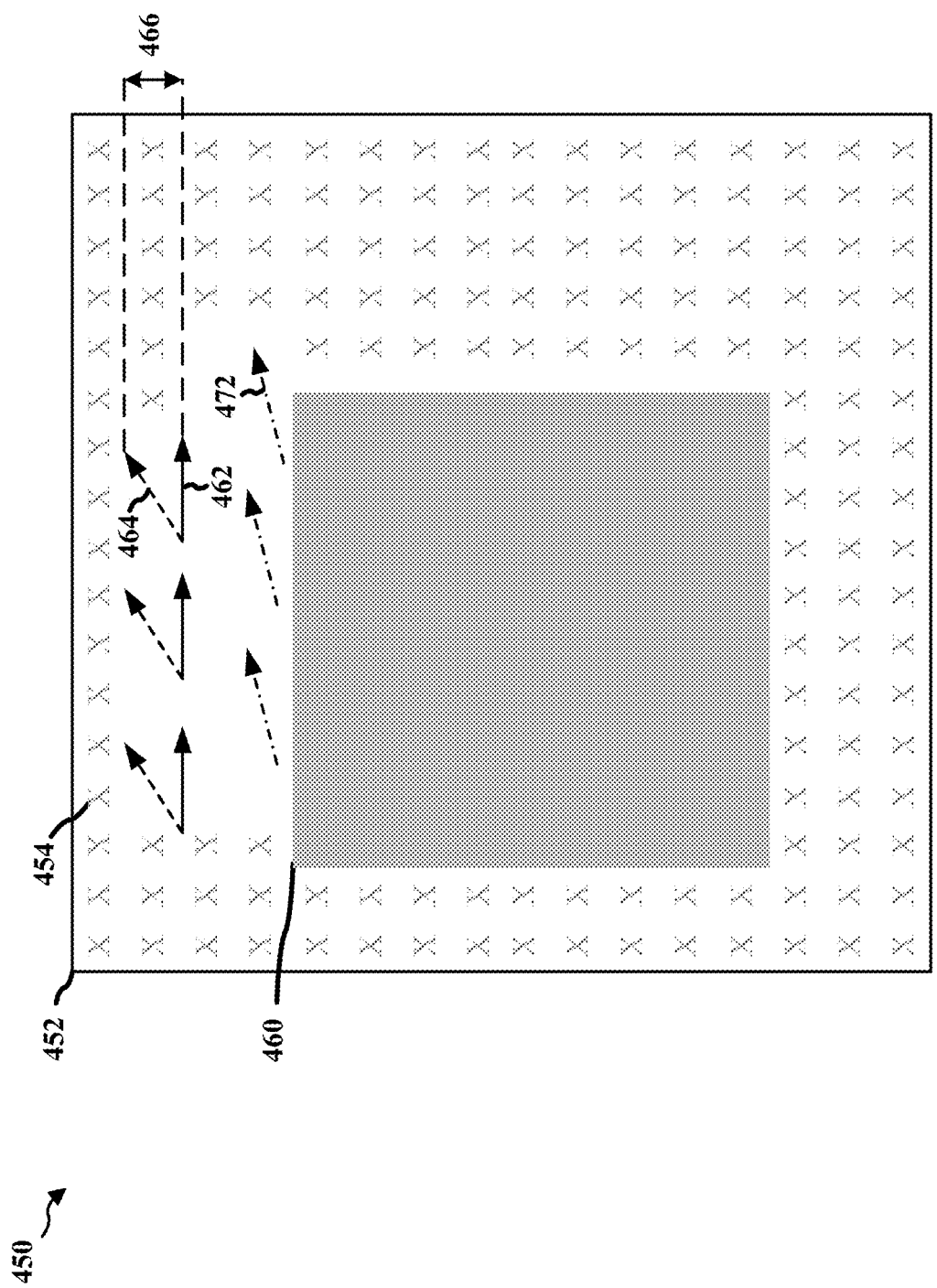
FIG. 4B illustrates another example of motion estimation according to the present disclosure.

FIG. 4B illustrates another example of motion estimation 450 according to the present disclosure. As displayed in FIG. 4B, motion estimation 450 includes frame 452, repeating background 454, inset textured image 460, at least one first motion vector 462, at least one second motion vector 464, difference 466 between the at least one first motion vector 462 and the at least one second motion vector 464, and at least one fourth motion vector 472. In FIG. 4B, as described in connection with FIG. 4A, at least one first motion vector 462 can be generated in a first frame subset of frame 452, where the at least one first motion vector 462 can provide a first motion estimation for image data in the first frame subset. As shown in FIG. 4B, in some aspects, the first frame subset can be located above the inset textured image 460 in a portion of repeating background 454. In other aspects, the first frame subset can be located in another portion of frame 452. In some instances, the image data in the first frame subset can be perturbed. Further, at least one second motion vector 464 can be generated based on the perturbed image data in the first frame subset, where the at least one second motion vector 464 can provide a second motion estimation for the image data in the first frame subset. Additionally, the at least one first motion vector 462 and the at least one second motion vector 464 can be compared. In some aspects, comparing the at least one first motion vector 462 and the at least one second motion vector 464 can comprise determining a difference 466 between the at least one first motion vector 462 and the at least one second motion vector 464. The difference 466 can be determined to be less than or greater than a threshold. In some aspects, at least one third motion vector can be determined for the motion estimation of the image data in the first frame subset based on the comparison between the at least one first motion vector 462 and the at least one second motion vector 464.

As shown in FIG. 4B, at least one fourth motion vector 472 can be determined for motion estimation of a second frame subset of frame 452. As shown in FIG. 4B, in some aspects, the second frame subset can be located below the first frame subset and above the inset textured image 460 in a portion of repeating background 454. In other aspects, the second frame subset can be located in another portion of frame 452. In some aspects, at least one fourth motion vector 472 can be determined when the difference 466 is greater than or equal to the threshold. As illustrated in FIG. 4B, in some aspects, the second frame subset can be different than the first frame subset. Also, the at least one third motion vector can be determined based on the at least one first motion vector 462, the at least one second motion vector 464, and the at least one fourth motion vector 472.

In some aspects, perturbing the image data in the first frame subset may comprise modifying a magnitude of red (R), green (G), and blue (B) (RGB) values of the image data by a value, e.g., m. In some instances, m may not be equal to zero. Further, m can be less than or equal to 5% and greater than or equal to −5%. Also, the image data in the first frame subset may be perturbed by a perturbation amount, and the perturbation amount may be adjusted based on a local variance of RGB values of the image data. The local variance of RGB values of the image data can also be based on the first motion estimation for the image data in the first frame subset. Moreover, the local variance of RGB values of the image data may be approximated based on a previous variance of RGB values. In other aspects, the image data in the first frame subset can be perturbed by a perturbation amount, and the perturbation amount can be adjusted based on a local variance of luminance (Y), first chrominance (U), and second chrominance (V) (YUV) values of the image data. Further, the image data from RGB image data can be converted to YUV image data, where the image data can be perturbed before converting the RGB image data to the YUV image data.

Figures 5A, 5B:
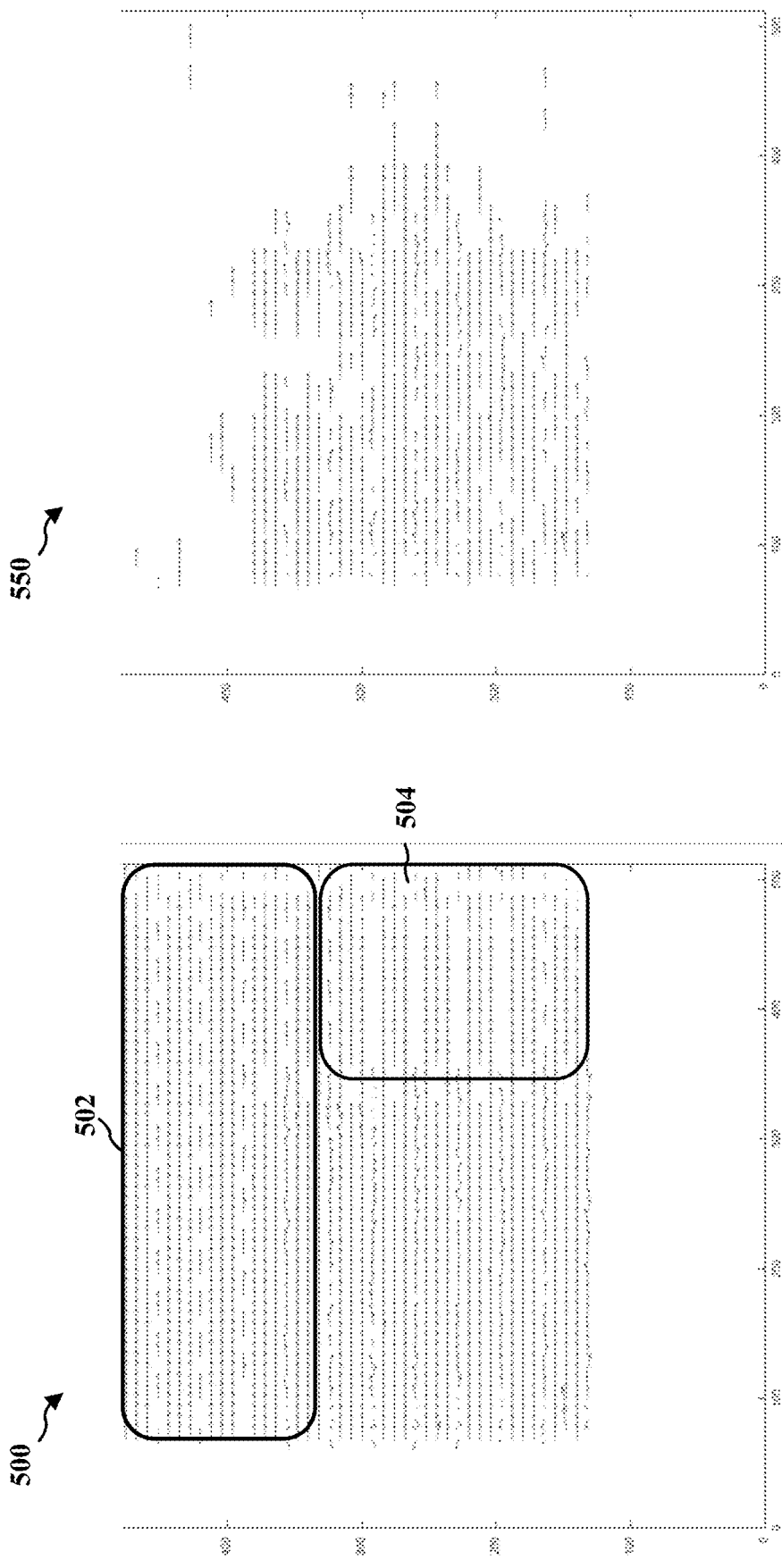
FIGS. 5A and 5B illustrate other examples of motion estimation according to the present disclosure.

FIGS. 5A and 5B illustrate examples of motion estimation 500 and 550 according to the present disclosure. As displayed in FIGS. 5A and 5B, motion estimation 500 and motion estimation 550 include corresponding motion vectors to assist with the motion estimation. More specifically, FIG. 5A illustrates motion estimation 500 without a perturbation pass. Accordingly, motion estimation 500 may include incorrect motion regions 502 and 504. FIG. 5B displays motion estimation 550 that includes a perturbation pass. As such, motion estimation 550 may not include erroneous motion regions, as these motion vectors have been identified as incorrect and removed.

Figure 6:
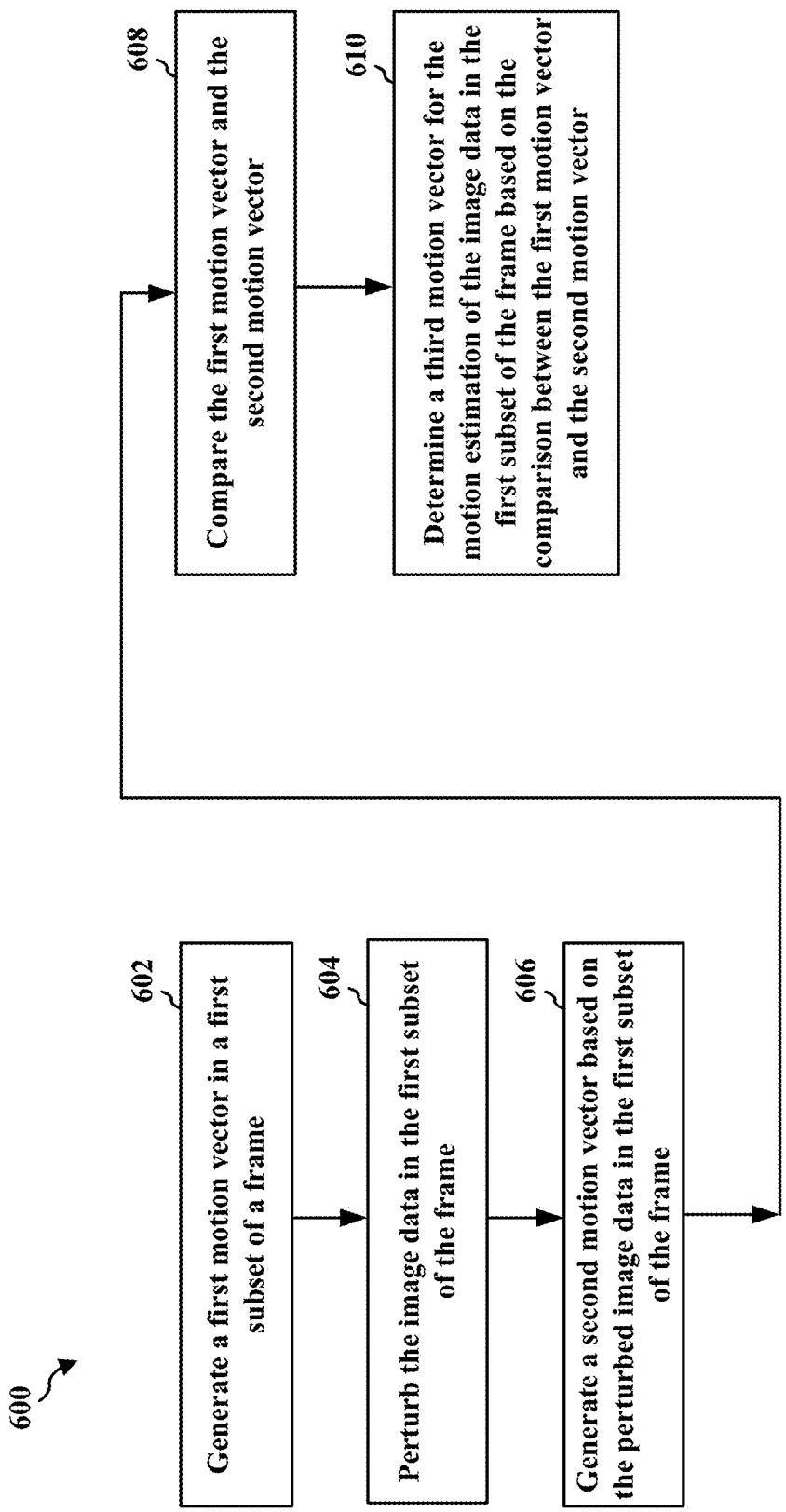
FIG. 6 illustrates an example flowchart of an example method in accordance with one or more techniques of this disclosure.

FIG. 6 illustrates an example flowchart 600 of an example method in accordance with one or more techniques of this disclosure. The method may be performed by a device or GPU. The method may assist a GPU in the process of motion estimation.

At 602, the GPU may generate at least one first motion vector in a first subset of a frame, as described in connection with the examples in FIGS. 2, 3, 4A, and 5B. For instance, the first motion vector may provide a first motion estimation for image data in the first subset of the frame. At 604, the GPU may perturb the image data, as described in connection with the examples in FIGS. 2, 3, 4A, and 5B. In some aspects, the GPU can perturb all the image data in the frame. In other aspects, the GPU may perturb the image data in the first subset of the frame. In other aspects, the GPU may perturb the image data outside the first subset of the frame. Additionally, at 606, the GPU may generate at least one second motion vector based on the perturbed image data, as described in connection with the examples in FIGS. 2, 3, 4A, and 5B. In some aspects, the second motion vector may provide a second motion estimation for the image data. At 608, the GPU may compare the first motion vector and the second motion vector, as described in connection with the examples in FIGS. 2, 3, 4A, and 5B. Further, at 610, the GPU may determine at least one third motion vector for the motion estimation of the image data based on the comparison between the first motion vector and the second motion vector, as described in connection with the examples in FIGS. 2, 3, 4A, 4B, and 5B.

In some aspects, when comparing the first motion vector and the second motion vector, the GPU can determine a difference between the first motion vector and the second motion vector, as described in connection with the example in FIG. 2. The difference can also be referred to as a delta analysis. In some instances, the difference can be an absolute value. Additionally, the GPU can determine whether the difference is less than a threshold, as further described in connection with the example in FIG. 2. Further, the third motion vector can be set to be the first motion vector when the difference is less than the threshold, as described in connection with the examples in FIGS. 2, 3, 4A, 4B and 5B. The GPU can also determine at least one fourth motion vector for motion estimation of a second subset of the frame when the difference is greater than the threshold, as described in connection with the example in FIG. 2. Also, the second subset of the frame can be different than the first subset of the frame. In some aspects, the third motion vector can be determined based on the determined first motion vector, second motion vector, and fourth motion vector, as described in connection with the examples in FIGS. 2, 3, 4A, 4B, and 5B.

Additionally, in some aspects, the third motion vector may be set to have a motion value of zero when the difference is greater than the threshold, as described in connection with the examples in FIGS. 2, 3, 4A, 4B, and 5B. In some aspects, the GPU can determine a second difference between the third motion vector and one or more neighboring vectors around the third motion vector, as described in connection with the examples in FIGS. 2, 3, 4A, 4B, and 5B. In these aspects, the third motion vector can be set based upon the one or more neighboring vectors when the difference is greater than the threshold and the second difference is less than the threshold.

In other aspects, the aforementioned threshold can also be based on a motion estimation tolerance for image data in the first subset of the frame, as described in connection with the examples in FIGS. 2, 3, 4A, 4B, and 5B. Additionally, perturbing the image data in the first subset of the frame may comprise modifying a magnitude of RGB values of the image data by m, as described in connection with the examples in FIGS. 2, 3, 4A, 4B, and 5B. In some instances, m may not be equal to zero. Moreover, the absolute value of m may be between −5% and 5%, such that m may be less than or equal to 5% and greater than or equal to −5%.

In yet other aspects, the image data in the first subset of the frame can be perturbed a perturbation amount, wherein the perturbation amount may be adjusted based on a local variance of RGB values of the image data, as described in connection with the examples in FIGS. 2, 3, 4A, 4B, and 5B. The local variance of RGB values of the image data may be based on the first motion estimation for the image data in the first subset of the frame, as described in connection with the examples in FIGS. 2, 3, 4A, 4B, and 5B. Further, the local variance of RGB values of the image data can be approximated based on a previous variance of RGB values, as described in connection with the examples in FIGS. 2, 3, 4A, 4B, and 5B. In other aspects, the image data in the first subset of the frame can be perturbed a perturbation amount, wherein the perturbation amount may be adjusted based on a local variance of YUV values of the image data, as described in connection with the examples in FIGS. 2, 3, 4A, 4B, and 5B. In yet other aspects, the GPU can convert the image data from RGB image data to YUV image data, wherein the image data is perturbed before converting the RGB image data to the YUV image data, as described in connection with the examples in FIGS. 2, 3, 4A, 4B, and 5B.

In one configuration, an apparatus for motion estimation is provided. The apparatus may be a motion estimation device in a GPU. In one aspect, the motion estimation device may be the processing unit 120 within the device 104 or may be some other hardware within the device 104 or another device. The apparatus may include means for generating at least one first motion vector in a first subset of a frame. The first motion vector may provide a first motion estimation for image data in the first subset of the frame. The apparatus may also include means for perturbing the image data in the first subset of the frame. Additionally, the apparatus may include means for generating at least one second motion vector based on the perturbed image data in the first subset of the frame. In some aspects, the second motion vector may provide a second motion estimation for the image data in the first subset of the frame. The apparatus may also include means for comparing the first motion vector and the second motion vector. Moreover, the apparatus may include means for determining at least one third motion vector for the motion estimation of the image data in the first subset of the frame based on the comparison between the first motion vector and the second motion vector.

In some aspects, the means for comparing the first motion vector and the second motion vector may be configured to determine a difference between the first motion vector and the second motion vector, and determine whether the difference is less than a threshold. The apparatus may also include means for determining at least one fourth motion vector for motion estimation of a second subset of the frame when the difference is greater than the threshold. The second subset of the frame can be different than the first subset of the frame, wherein the third motion vector is determined based on the determined first motion vector, second motion vector, and fourth motion vector. Additionally, the apparatus may include means for determining a second difference between the third motion vector and one or more neighboring vectors around the third motion vector. The third motion vector may be set based upon the one or more neighboring vectors when the difference is greater than the threshold and the second difference is less than the threshold. Further, the means for perturbing the image data in the first subset of the frame may be configured to modify a magnitude of RGB values of the image data by m, where m is not equal to zero. Moreover, the apparatus may include means for converting the image data from RGB image data to YUV image data, wherein the image data is perturbed before converting the RGB image data to the YUV image data.

The subject matter described herein can be implemented to realize one or more potential benefits or advantages. For instance, the described techniques can be used by GPUs reduce the amount of rendering workload. Systems described herein can utilize motion estimation in order to extrapolate frames from previously rendered content. By doing so, this can allow the GPU to render frames at a reduced rate, with the extrapolated frames being displayed in the place of rendered content. Accordingly, the present disclosure can reduce the rendering workload by rendering fewer frames on the GPU and using the motion estimation to fill the gaps in the images or motion vectors. As a result, the present disclosure can save power and performance at the GPU, as well as render more high quality frames at the GPU. In addition, the present disclosure can also reduce the cost of rendering content.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
generating at least one first motion vector in a first subset of a frame, the at least one first motion vector providing a first motion estimation for image data in the first subset of the frame;
perturbing the image data in the first subset of the frame;
generating at least one second motion vector based on the perturbed image data in the first subset of the frame, the at least one second motion vector providing a second motion estimation for the image data in the first subset of the frame;
comparing the at least one first motion vector and the at least one second motion vector by determining whether a difference between the at least one first motion vector and the at least one second motion vector is less than a threshold;
determining at least one fourth motion vector for motion estimation of a second subset of the frame when the difference is greater than the threshold, the second subset of the frame being different than the first subset of the frame; and
determining at least one third motion vector for the motion estimation of the image data in the first subset of the frame based on the comparison between the at least one first motion vector and the at least one second motion vector, wherein the at least one third motion vector is set to be the at least one first motion vector when an absolute value of the difference is less than the threshold, wherein the at least one third motion vector is set to have a motion value of zero when the absolute value of the difference is greater than or equal to the threshold, wherein the at least one third motion vector is determined based on the at least one first motion vector, the at least one second motion vector, and the at least one fourth motion vector.

2. The method of claim 1, further comprising:
determining a second difference between the at least one third motion vector and one or more neighboring vectors around the at least one third motion vector;
wherein the at least one third motion vector is set based upon the one or more neighboring vectors when the difference is greater than the threshold and the second difference is less than the threshold.

3. The method of claim 1, wherein the threshold is based on a motion estimation tolerance for image data in the first subset of the frame.

4. The method of claim 1, wherein perturbing the image data in the first subset of the frame comprises modifying a magnitude of red (R), green (G), and blue (B) (RGB) values of the image data by m, where m is not equal to 0.

5. The method of claim 4, wherein m is less than or equal to 5% and greater than or equal to −5%.

6. The method of claim 1, wherein the image data in the first subset of the frame is perturbed by a perturbation amount, and the perturbation amount is adjusted based on a local variance of red (R), green (G), and blue (B) (RGB) values of the image data.

7. The method of claim 6, wherein the local variance of RGB values of the image data are based on the first motion estimation for the image data in the first subset of the frame.

8. The method of claim 6, wherein the local variance of RGB values of the image data are approximated based on a previous variance of RGB values.

9. The method of claim 1, wherein the image data in the first subset of the frame is perturbed by a perturbation amount, and the perturbation amount is adjusted based on a local variance of luminance (Y), first chrominance (U), and second chrominance (V) (YUV) values of the image data.

10. The method of claim 1, further comprising converting the image data from red (R), green (G), blue (B) (RGB) image data to luminance (Y), first chrominance (U), second chrominance (V) (YUV) image data, wherein the image data is perturbed before converting the RGB image data to the YUV image data.

11. An apparatus for graphics processing, comprising:
a memory; and
at least one processor coupled to the memory and configured to:
generate at least one first motion vector in a first subset of a frame, the at least one first motion vector providing a first motion estimation for image data in the first subset of the frame;
perturb the image data in the first subset of the frame;
generate at least one second motion vector based on the perturbed image data in the first subset of the frame, the at least one second motion vector providing a second motion estimation for the image data in the first subset of the frame;
compare the at least one first motion vector and the at least one second motion vector by determining whether a difference between the at least one first motion vector and the at least one second motion vector is less than a threshold;
determine at least one fourth motion vector for motion estimation of a second subset of the frame when the difference is greater than the threshold, the second subset of the frame being different than the first subset of the frame; and
determine at least one third motion vector for the motion estimation of the image data in the first subset of the frame based on the comparison between the at least one first motion vector and the at least one second motion vector, wherein the at least one third motion vector is set to be the at least one first motion vector when an absolute value of the difference is less than the threshold, wherein the at least one third motion vector is set to have a motion value of zero when the absolute value of the difference is greater than or equal to the threshold, wherein the at least one third motion vector is determined based on the at least one first motion vector, the at least one second motion vector, and the at least one fourth motion vector.

12. The apparatus of claim 11, wherein the at least one processor is further configured to:
determine a second difference between the at least one third motion vector and one or more neighboring vectors around the at least one third motion vector;
wherein the at least one third motion vector is set based upon the one or more neighboring vectors when the difference is greater than the threshold and the second difference is less than the threshold.

13. The apparatus of claim 11, wherein the threshold is based on a motion estimation tolerance for image data in the first subset of the frame.

14. The apparatus of claim 11, wherein to perturb the image data in the first subset of the frame includes the at least one processor further configured to modify a magnitude of red (R), green (G), and blue (B) (RGB) values of the image data by m, where m is not equal to 0.

15. The apparatus of claim 14, wherein m is less than or equal to 5% and greater than or equal to −5%.

16. The apparatus of claim 11, wherein the image data in the first subset of the frame is perturbed by a perturbation amount, and the perturbation amount is adjusted based on a local variance of red (R), green (G), and blue (B) (RGB) values of the image data.

17. The apparatus of claim 16, wherein the local variance of RGB values of the image data are based on the first motion estimation for the image data in the first subset of the frame.

18. The apparatus of claim 16, wherein the local variance of RGB values of the image data are approximated based on a previous variance of RGB values.

19. The apparatus of claim 11, wherein the image data in the first subset of the frame is perturbed by a perturbation amount, and the perturbation amount is adjusted based on a local variance of luminance (Y), first chrominance (U), and second chrominance (V) (YUV) values of the image data.

20. The apparatus of claim 11, wherein the at least one processor is further configured to convert the image data from red (R), green (G), blue (B) (RGB) image data to luminance (Y), first chrominance (U), second chrominance (V) (YUV) image data, wherein the image data is perturbed before converting the RGB image data to the YUV image data.

21. An apparatus for graphics processing, comprising:
means for generating at least one first motion vector in a first subset of a frame, the at least one first motion vector providing a first motion estimation for image data in the first subset of the frame;
means for perturbing the image data in the first subset of the frame;
means for generating at least one second motion vector based on the perturbed image data in the first subset of the frame, the at least one second motion vector providing a second motion estimation for the image data in the first subset of the frame;

means for comparing the at least one first motion vector and the at least one second motion vector by determining whether a difference between the at least one first motion vector and the at least one second motion vector is less than a threshold;

means for determining at least one fourth motion vector for motion estimation of a second subset of the frame when the difference is greater than the threshold, the second subset of the frame being different than the first subset of the frame; and means for determining at least one third motion vector for the motion estimation of the image data in the first subset of the frame based on the comparison between the at least one first motion vector and the at least one second motion vector, wherein the at least one third motion vector is set to be the at least one first motion vector when an absolute value of the difference is less than the threshold, wherein the at least one third motion vector is set to have a motion value of zero when the absolute value of the difference is greater than or equal to the threshold, wherein the at least one third motion vector is determined based on the at least one first motion vector, the at least one second motion vector, and the at least one fourth motion vector.

22. A non-transitory computer-readable medium storing computer executable code for graphics processing, the code when executed by a processor causes the processor to:

generate at least one first motion vector in a first subset of a frame, the at least one first motion vector providing a first motion estimation for image data in the first subset of the frame;

perturb the image data in the first subset of the frame;

generate at least one second motion vector based on the perturbed image data in the first subset of the frame, the at least one second motion vector providing a second motion estimation for the image data in the first subset of the frame;

compare the at least one first motion vector and the at least one second motion vector by determining whether a difference between the at least one first motion vector and the at least one second motion vector is less than a threshold;

determine at least one fourth motion vector for motion estimation of a second subset of the frame when the difference is greater than the threshold, the second subset of the frame being different than the first subset of the frame; and determine at least one third motion vector for the motion estimation of the image data in the first subset of the frame based on the comparison between the at least one first motion vector and the at least one second motion vector, wherein the at least one third motion vector is set to be the at least one first motion vector when an absolute value of the difference is less than the threshold, wherein the at least one third motion vector is set to have a motion value of zero when the absolute value of the difference is greater than or equal to the threshold, wherein the at least one third motion vector is determined based on the at least one first motion vector, the at least one second motion vector, and the at least one fourth motion vector.

* * * * *